(12) United States Patent
Kim et al.

(10) Patent No.: US 10,587,167 B2
(45) Date of Patent: Mar. 10, 2020

(54) ROTOR ASSEMBLY HAVING IMPROVED COOLING PATH

(71) Applicant: DOOSAN HEAVY INDUSTRIES & CONSTRUCTION CO., LTD., Changwon-si, Gyeongsangnam-do (KR)

(72) Inventors: Sung Ha Kim, Changwon-si (KR); Kye Ha Hwang, Changwon-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 945 days.

(21) Appl. No.: 15/085,035

(22) Filed: Mar. 30, 2016

(65) Prior Publication Data
US 2017/0063199 A1    Mar. 2, 2017

(30) Foreign Application Priority Data

Aug. 24, 2015   (KR) .................... 10-2015-0118833

(51) Int. Cl.
*H02K 9/12* (2006.01)
*H02K 3/24* (2006.01)
(Continued)

(52) U.S. Cl.
CPC ............. *H02K 9/005* (2013.01); *H02K 3/24* (2013.01); *H02K 3/38* (2013.01); *H02K 9/12* (2013.01); *H02K 1/32* (2013.01)

(58) Field of Classification Search
CPC .. H02K 3/00; H02K 3/02; H02K 3/04; H02K 3/12; H02K 3/14; H02K 3/16; H02K 3/18;
(Continued)

(56) References Cited

U.S. PATENT DOCUMENTS

| 4,709,177 A | * | 11/1987 | Kaminski | ............... H02K 3/24 310/214 |
| 6,252,318 B1 | * | 6/2001 | Kazmierczak | ........... H02K 3/24 310/260 |

(Continued)

FOREIGN PATENT DOCUMENTS

| GB | 731299 A | 6/1955 |
| JP | 7-213000 A | 8/1995 |

(Continued)

OTHER PUBLICATIONS

Yamazaki Masaru, Tubular Rotor for Electric Rotating Machine, Mar. 9, 1999, Fuji Electric Co, JP 11-069719 (English Machine Translation) (Year: 1999).*

(Continued)

*Primary Examiner* — Jermele M Hollington
*Assistant Examiner* — Alexander A Singh
(74) *Attorney, Agent, or Firm* — Invenstone Patent, LLC

(57) ABSTRACT

A rotor assembly includes: coil turns each of which has a plurality of conductors stacked in a multilayer structure and includes a linear part interposed between teeth of a rotor body and formed in a longitudinal direction with ducts through which cooling fluid moves, and a curved part extending from the linear part and disposed in an arc shape on an outer circumferential surface of a spindle; and a turn insulator interposed between the conductors, and insulating the conductors from each other. The curved part may include a wave-shaped cooling path, which is formed in a longitudinal direction in a planar surface thereof, communicates with the ducts, and guides the cooling fluid to the ducts. Furthermore, through holes each of which is shorter than the duct are formed in the turn insulator at a position corresponding to the duct.

16 Claims, 11 Drawing Sheets

(51) Int. Cl.
*H02K 1/32* (2006.01)
*H02K 9/00* (2006.01)
*H02K 3/38* (2006.01)

(58) Field of Classification Search
CPC .. H02K 3/20; H02K 3/22; H02K 3/24; H02K 3/26; H02K 3/28; H02K 3/30; H02K 3/32; H02K 3/325; H02K 3/34; H02K 3/345; H02K 3/38; H02K 3/40; H02K 3/42; H02K 3/44; H02K 3/46; H02K 3/47; H02K 3/48; H02K 3/487; H02K 3/493; H02K 3/50; H02K 3/505; H02K 3/51; H02K 3/52; H02K 3/521; H02K 3/522; H02K 3/524; H02K 3/525; H02K 3/527; H02K 3/528; H02K 1/32; H02K 9/00; H02K 9/005; H02K 9/02; H02K 9/04; H02K 9/08; H02K 9/10; H02K 9/12; H02K 9/14; H02K 9/16; H02K 9/18; H02K 9/19; H02K 9/193; H02K 9/197; H02K 9/20
USPC ... 310/54, 58, 59, 61, 52, 201, 260, 270, 64
See application file for complete search history.

(56) References Cited

U.S. PATENT DOCUMENTS

| | | | |
|---|---|---|---|
| 6,628,020 B1 | 9/2003 | General Electric Company | |
| 2002/0185923 A1* | 12/2002 | Mori | H02K 3/24 310/61 |
| 2005/0264130 A1* | 12/2005 | Nygard | H02K 3/527 310/261.1 |
| 2007/0085428 A1* | 4/2007 | Hattori | H02K 3/24 310/58 |
| 2015/0162804 A1* | 6/2015 | Tolpadi | H02K 9/005 310/59 |

FOREIGN PATENT DOCUMENTS

| | | | |
|---|---|---|---|
| JP | 07213000 A | * | 8/1995 |
| JP | 11069719 A | * | 3/1999 |
| JP | 2009-136062 A | | 6/2009 |
| JP | 2015-112006 A | | 6/2015 |
| KR | 10-2010-0044127 A | | 4/2010 |

OTHER PUBLICATIONS

Fukuhara Yumiko, Mimura Ichiro, Structure for Cooling End of Rotor Coil in Electric Rotating Machine, Aug. 11, 1995, Fuji Electric Col, JP 07-213000 (English Machine Translation) (Year: 1995).*
Communication dated Sep. 26, 2016 issued by the Korean Patent Office in counterpart application No. 10-2015-0118833.
Communication dated Nov. 16, 2016 issued by the European Patent Office in counterpart application No. 16165001.5.
Communication dated Feb. 28, 2017 from the Japanese Patent Office in counterpart application No. 2016-062025.

* cited by examiner

ROTOR ASSEMBLY HAVING IMPROVED COOLING PATH

CROSS-REFERENCE TO RELATED APPLICATION

This application claims priority to Korean Patent Application No. 10-2015-118833, filed on Aug. 24, 2015, the disclosure of which is incorporated herein by reference in its entirety.

BACKGROUND

Field

Exemplary embodiments of the present disclosure relate to a rotor assembly having an improved cooling path, and more particularly, to a rotor assembly in which the structure of a cooling path formed in a coil turn is improved and a problem of an imbalance in heat transfer of the coil turn can be overcome.

Description of the Related Art

Generally, a generator is an apparatus which converts mechanical energy into electric energy using electromagnetic induction, and which uses the principle in which electric power is generated when a conductor rotates in a magnetic field. Such a generator uses hydrogen gas and water as a cooling medium, and has a hermetically sealed structure to prevent penetration of dust or moisture and leakage of hydrogen gas.

For ventilation in the generator, a closed circulation system using a fan installed on a shaft of a rotor is employed, and a cooler for cooling hydrogen gas is installed in the generator. Furthermore, a stator houses the rotor therein, and includes a coil, a stator core around which a coil is wound, and a frame which supports them.

When the rotor rotates, current flowing through the coil generates heat. If heat generated from the coil of the rotor is not effectively dissipated, it causes deterioration in performance of the generator.

To overcome this problem, a rotor and a rotating electric machine having a structure for cooling the rotor were proposed in Korean Patent Unexamined Publication No. 2010-0120267.

The conventional cooling structure is a structure in which cooling of a conductor assembled in a rotor body depends on only cooling fluid which is drawn into a sub-slot. However, the conventional cooling structure is problematic in that as generators are becoming larger, it is difficult to efficiently cool a rotor coil of a generator.

PRIOR ART DOCUMENT

Patent Document

Japanese Patent Unexamined Publication No. 2010-0120267 (Publication Date: Nov. 15, 2010)

SUMMARY

An object of the present disclosure is to provide a rotor assembly in which the structure of a cooling path formed in a coil turn is improved and a problem of an imbalance in heat transfer of the coil turn can be overcome.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a rotor assembly having an improved cooling path may include: a plurality of coil turns each comprising a plurality of conductors stacked in a multilayer structure, each of the coil turns comprising: a linear part interposed between teeth of a rotor body, with a plurality of ducts formed in a longitudinal direction through the linear part so that cooling fluid flows through the ducts; and a curved part extending from the linear part and disposed in an arc shape on an outer circumferential surface of a spindle; and a turn insulator interposed between the conductors, and insulating the conductors from each other, wherein the curved part may include a wave-shaped cooling path formed in a longitudinal direction in a planar surface thereof and communicating with the ducts, the cooling path guiding the cooling fluid to the ducts.

The cooling path may include a plurality of arc-shaped slots, and a connection part connecting the slots to each other.

The connection part may have a streamlined edge.

A height (A) of the connection part may be greater than a radius (D2) of each of the slots.

The cooling path may be configured such that the slots have a same radius and are repeatedly formed with the connection part disposed therebetween.

The cooling path may be configured such that the slots have different radii and are alternately arranged with the connection part disposed therebetween.

The cooling path may comprise cooling paths respectively formed in at least two of the conductors that face each other with the turn insulator therebetween, and the cooling paths are formed to face each other.

The turn insulator may include a plurality of through holes formed through a planar surface thereof and communicating with the slots The turn insulator may be closed on a portion thereof corresponding to the connection part.

In accordance with another aspect of the present disclosure, a rotor assembly having an improved cooling path may include: a coil turn including a pair of conductors forming a top layer and a bottom layer that face each other, the conductors being stacked in a multilayer structure, the coil turn including: a linear part interposed between teeth of a rotor body, with a plurality of ducts formed in a longitudinal direction through the linear part so that cooling fluid flows through the ducts; and a curved part extending from the linear part and disposed in an arc shape on an outer circumferential surface of a spindle, wherein the curved part may include a wave-shaped cooling path formed in a longitudinal direction in a planar surface thereof and communicating with the ducts, the cooling path guiding the cooling fluid to the ducts.

The cooling path may comprise cooling paths respectively formed in the top layer and the bottom layer such that the cooling paths face each other Each of the cooling paths may include a plurality of slots, and a connection part connecting the slots to each other.

The connection part may have a streamlined edge.

A height (A) of the connection part is greater than a radius (D2) of each of the slots.

The cooling path may be configured such that the slots have a same radius and are repeatedly formed with the connection part disposed therebetween.

The cooling path may be configured such that the slots have different radii and are alternately arranged with the connection part disposed therebetween.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, a rotor assembly in accordance with an exemplary embodiment of the present disclosure will be described in detail with reference to the attached drawings. However, for the sake of explanation, a cooling structure in a coil turn will be first described, and thereafter an insulator cooling structure of the coil turn will be described.

Figure 1:
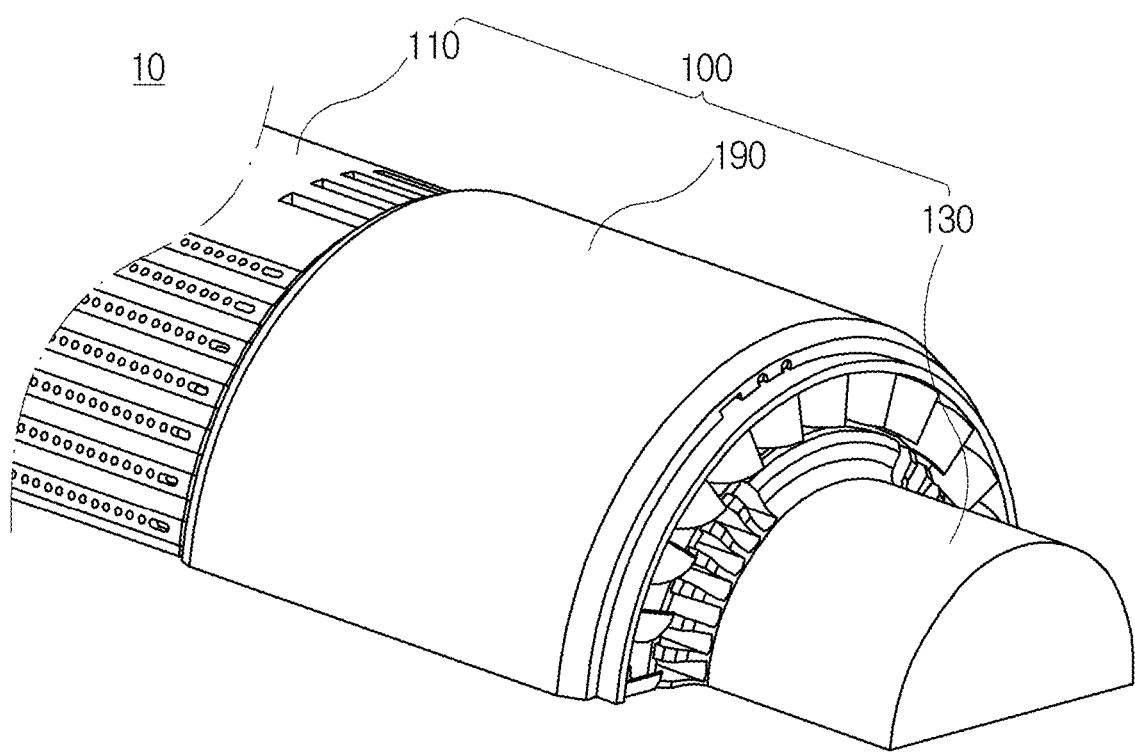
FIG. 1 is a partial perspective view illustrating a rotor assembly in accordance with an exemplary embodiment of the present disclosure.
Figure 2:
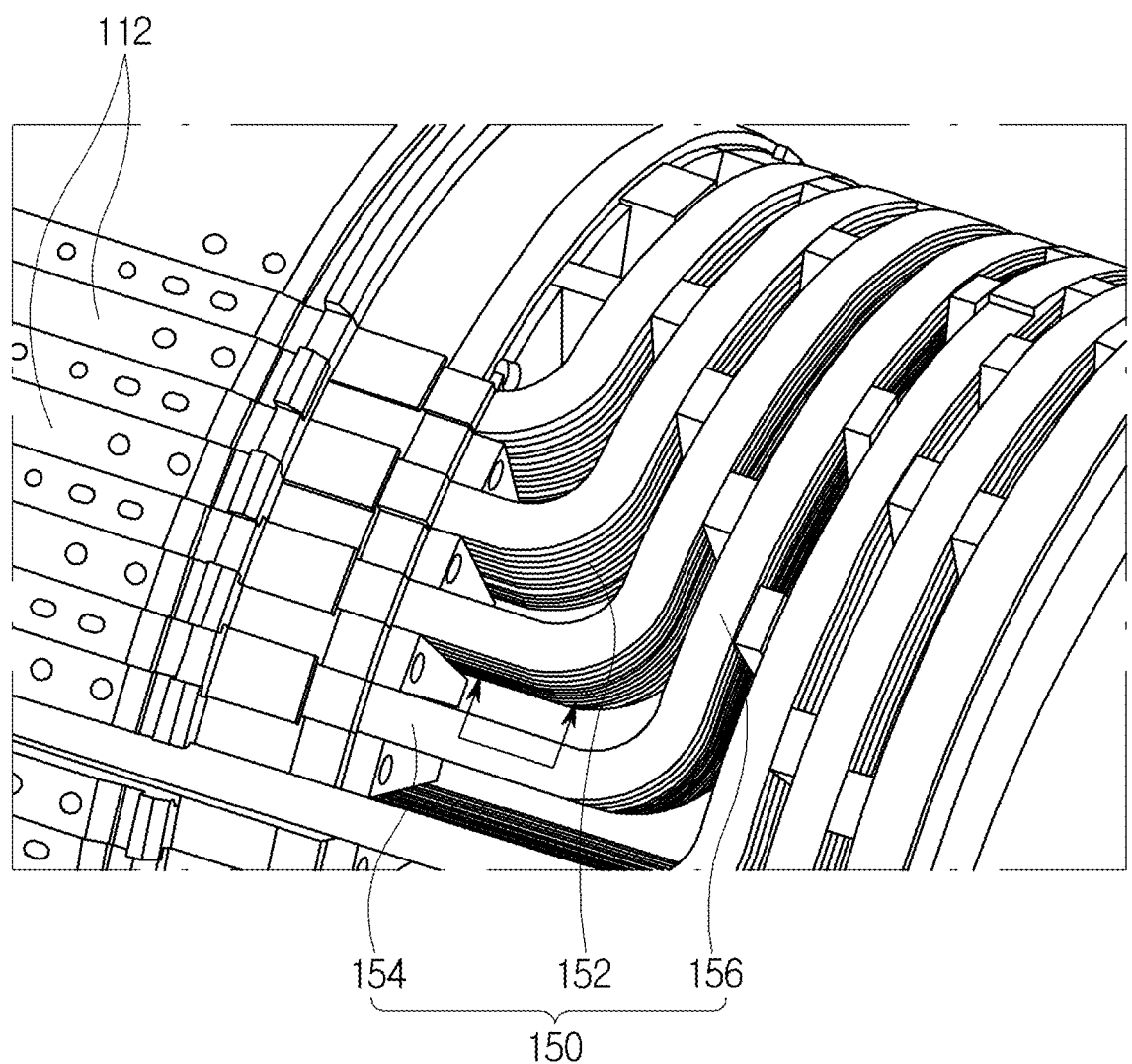
FIG. 2 is a partial perspective view showing a part of the rotor assembly of FIG. 1.
Figure 3:
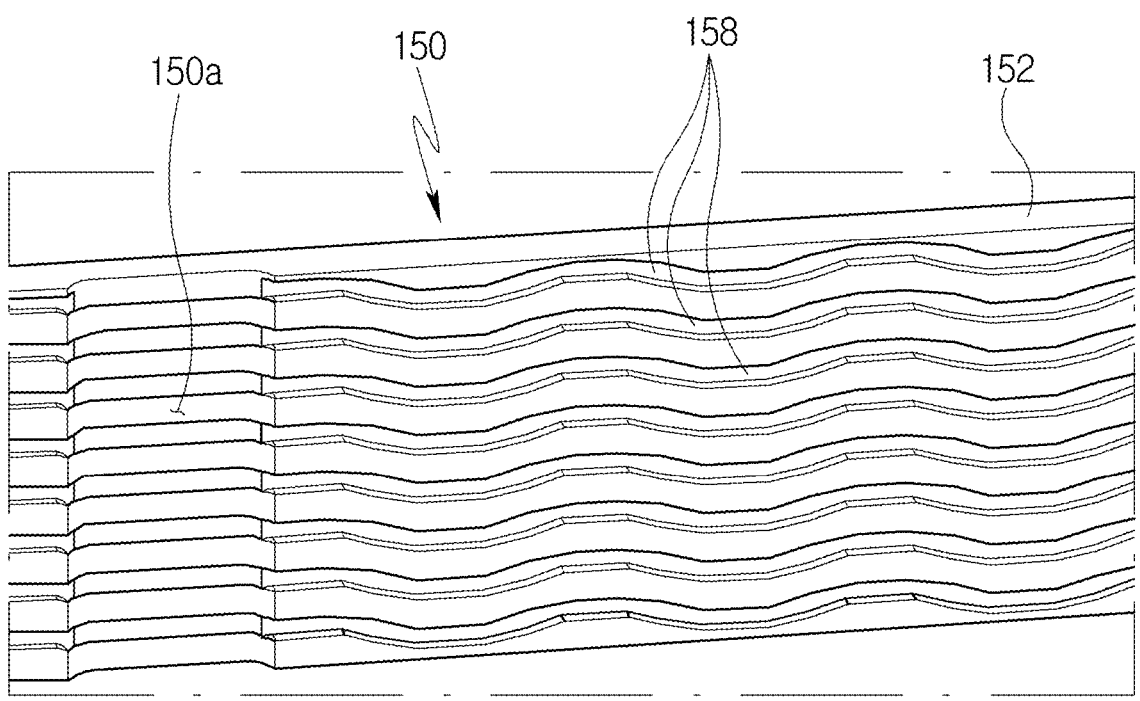
FIG. 3 is a partial perspective view showing a part of a coil turn in accordance with FIG. 2.

FIG. 1 is a partial perspective view illustrating a rotor assembly in accordance with an exemplary embodiment. FIG. 2 is a partial perspective view showing a part of the rotor assembly of FIG. 1. FIG. 3 is a partial perspective view showing a part of a coil turn in accordance with FIG. 2.

As shown in FIGS. 1 to 3, a rotor assembly 10 for a generator in accordance with an exemplary embodiment of the claimed invention includes a rotor 100 which is disposed in a stator so as to be rotatable, and a plurality of coil turns 150 which are disposed on an outer circumferential surface of the rotor 100. The coil turns 150 are housed in a housing 190 and thus prevented from being exposed outside the rotor 100.

The rotor 100 includes a rotor body 110 in which a plurality of teeth 112 and sub-slots (not shown) are formed, and a spindle 130 which extends from one side of the rotor body 110. The plurality of coil turns 150 are disposed around the spindle 130.

The teeth 112 extend radially outward from the outer circumferential surface of the rotor body 110 toward the stator. The teeth 112 may be provided on the entirety or a partial region of the outer circumferential surface of the rotor body 110 depending on the coupling relationship with other parts. A linear part 154 of each coil turn 150 (which will be described later) is inserted into an upper portion of space between corresponding adjacent teeth 112, and a lower portion of the space is a portion in which a sub-slot is formed. That is, each sub-slot is formed between corresponding adjacent teeth 112 and disposed below the corresponding coil turn 150 with the linear part 154 interposed between the teeth 112. The sub-slots function to guide cooling fluid drawn into space below the linear parts 154 of the coil turns 150, into the space between the teeth 112 so as to cool the rotor body 110.

Each coil turn 150 includes conductors 152 which are stacked in a multilayer structure, and a turn insulator 170 (FIG. 4) which is interposed between the conductors 152 for insulation between the conductors 152.

The conductors 152 are configured such that parts (linear parts) thereof that are interposed between the teeth 112 are stacked in a linear shape, and parts (curved parts) thereof extend from the stacked linear parts in an arc shape enclosing the outer circumferential surface of the spindle 130. A single coil turn 150 is formed in an approximately V-shaped configuration in which: a linear part 154 formed on one side of a multilayer stack of conductors 152 is inserted between the teeth 112 in a longitudinal direction of the rotor 100; a curved part 156 of the multilayer stack is disposed on the outer circumferential surface of the spindle; and a linear part 154 formed on the other side of the multilayer stack is inserted between the corresponding teeth 112 that are disposed at the other side. A plurality of coil turns 150 each having the above-mentioned configuration are disposed on the rotor 100 and respectively interposed between the teeth 112. A plurality of ducts 150a each having a slit shape are longitudinally formed through planar surfaces of the conductors 152 that form the linear part 154.

In the curved part 156, a cooling path 158 through which cooling fluid can flow is formed in each planar surface. The cooling path 158 is connected to the corresponding duct 150a of the linear part 154 so that the cooling fluid can be discharged through the duct 150a.

As shown in FIG. 3, each cooling path 158 may be formed in a wave shape and include a plurality of slots 158a each of which has an arc shape, and connection parts 158b which connect the slots 158a with each other. The connection parts 158b each have a linear shape, and are formed between the slots 158a.

The above-mentioned cooling path may be changed in configuration depending on whether the coil turn has a single layer structure (one turn—one layer) or a multilayer structure (one turn—two layers).

Figure 4:
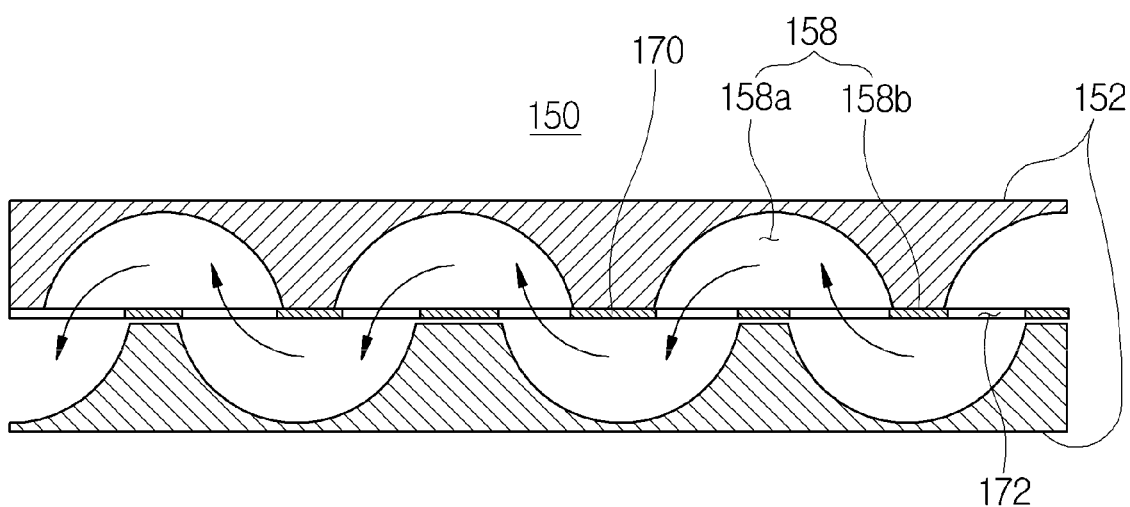
FIG. 4 is a sectional view illustrating a cooling path of a coil turn having a single layer structure as an example of the coil turn in accordance with FIG. 2.
Figure 5:
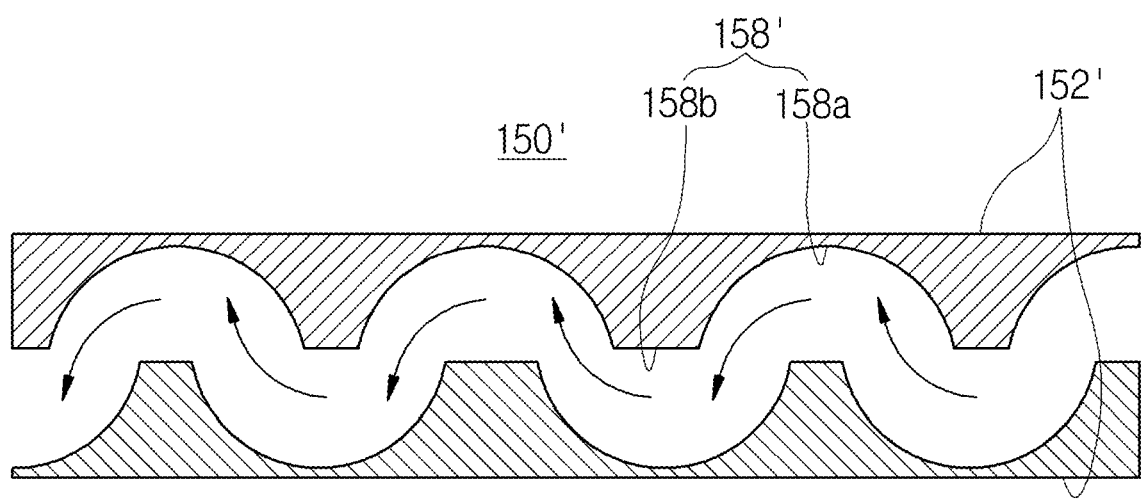
FIG. 5 is a sectional view illustrating a cooling path of a coil turn having a multilayer structure as another example of the coil turn in accordance with FIG. 2.
Figure 6:
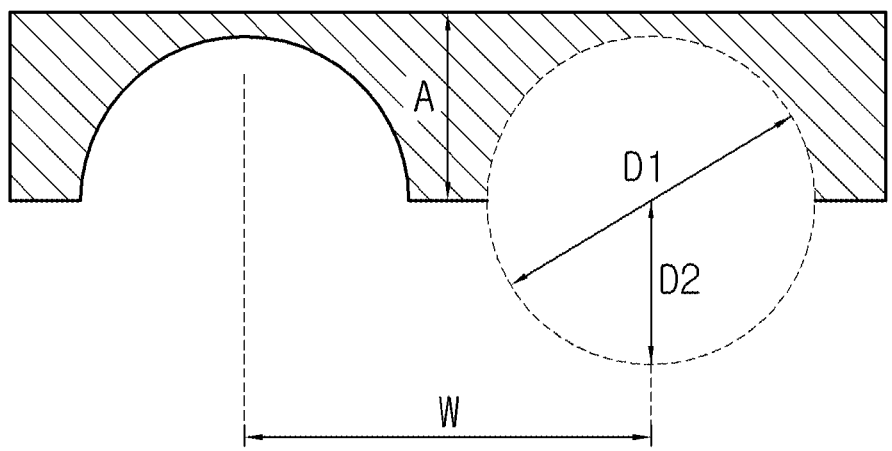
FIG. 6 is an enlarged sectional view showing a part of the cooling path in accordance with FIG. 4 or 5.

FIG. 4 is a sectional view illustrating a cooling path of a coil turn having a single layer structure as an example of the coil turn in accordance with FIG. 2. FIG. 5 is a sectional view illustrating a cooling path of a coil turn having a multilayer structure as another example of the coil turn according to FIG. 2. FIG. 6 is an enlarged sectional view showing a part of the cooling path in accordance with FIG. 4 or 5.

As shown in FIG. 4, the coil turn 150 having a single layer structure is configured such that the turn insulator 170 is interposed between the conductors 152, and the cooling paths 158 formed in two conductors 152 that face each other with one turn insulator 170 interposed therebetween face each other.

To allow cooling fluid to smoothly flow through the cooling paths 158, it is preferable that the cooling paths 158 be alternately disposed such that each arc-shaped slot 158a faces the corresponding connection part 158b of the other cooling path 158. Furthermore, in order to prevent the flow of cooling fluid from being impeded, through holes 172 are preferably formed in a planar surface of the turn insulator 170 in a shape corresponding to the shape of the cooling paths 158 such that the cooling fluid can flow along the cooling paths 158. That is, it is preferable that the turn insulator 170 come into contact with each of the connection parts 158b to insulate the connection part 158b from the other conductor 152 and be formed with the through holes 172 such that the slots 158a communicate with each other.

As shown in FIG. 5, the coil turn 150' having the multilayer structure is characterized in that two conductors 152' that face each other respectively form a top layer and a bottom layer and there is no turn insulator between the top layer and the bottom layer.

The coil turn 150' having the multilayer structure is also preferably formed such that the cooling paths 158' formed in the two facing conductors 152' face each other. That is, the cooling paths 158' are alternately disposed such that slots 158a formed in one conductor 152' face the corresponding connection parts 158b formed in the other conductor 152'.

Referring to FIG. 6, a slot pitch W which is a distance between the center of a slot 158a of the cooling path 158 and the center of an adjacent slot 158a may be designed such that it is the same for all of the slots 158a, or short slot pitch parts and long slot pitch parts are alternately disposed.

Furthermore, it is preferable that when based on an imaginary circle having an arc of the slot 158a as a circumference thereof, a radius D2 of a diameter D1 of the imaginary circle be smaller than a height A of the connection part 158b. The reason for this is because of the fact that if the radius D2 of the slot 158a is larger than the height A of the connection part 158b, a thickness between the slot 158a and the planar surface of the conductor 152 is excessively reduced whereby it may affect the stiffness of the conductor 152. Therefore, it is preferable that the radius of the slot 158a be smaller than the height A of the connection part 158b.

As described above, since the cooling path 158 has a wave shape, a contact area between the conductor 152 and cooling fluid is increased. Consequently, compared to the conventional linear cooling path, the rate at which heat is transferred from the conductor 152 to the cooling fluid can be increased. Therefore, the efficiency of cooling the conductor can be enhanced.

In order to minimize resistance to the flow of cooling fluid that flows along the cooling path 158, the shape of the cooling path 158 may be changed as follows.

Figure 7:
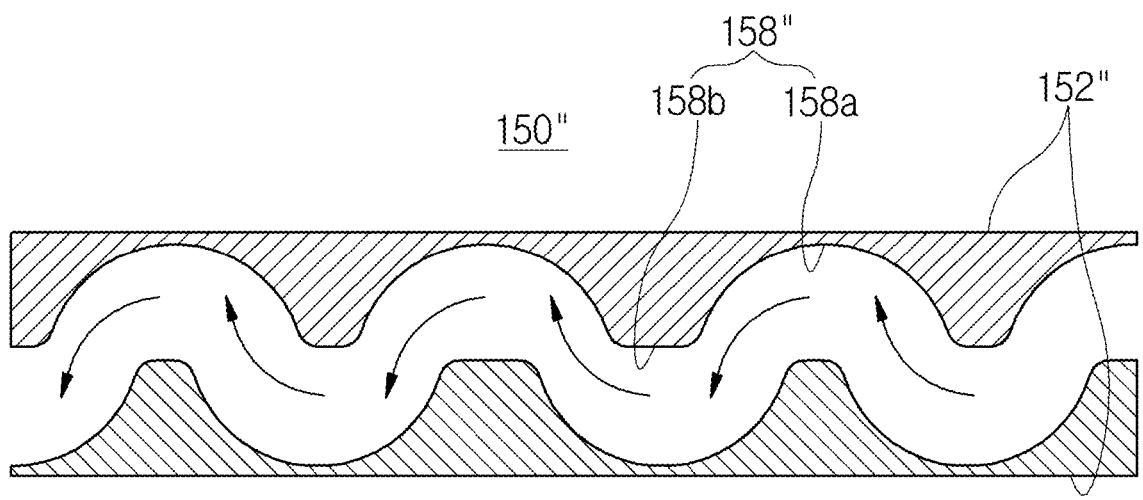
FIG. 7 is a sectional view showing another exemplary embodiment of the cooling path in accordance with the present disclosure.

FIG. 7 is a sectional view showing another embodiment of the cooling path in accordance with the present disclosure in which a contact area between a conductor 152" and a cooling fluid is increased.

As shown in FIG. 7, in a cooling path 158" in accordance with another embodiment of the present disclosure, a junction between each slot 158a and the corresponding connection part 158b may be formed in a streamlined shape. The cooling path 158" having the above-mentioned shape is advantageous in that during the flow of cooling fluid, flow resistance which occurs when the cooling fluid flows from the slot 158a over the connection part 158b can be minimized.

As described above, in a rotor assembly in accordance with an exemplary embodiment of the present disclosure, as the structure of a cooling path formed in a coil turn 150" is modified into a wave form, the contact area between cooling fluid and the inner surface of the coil turn 150" can be increased, whereby the cooling efficiency can be enhanced.

Hereinafter, a structure of cooling the turn insulator in accordance with the coil turn will be described.

Figure 8:
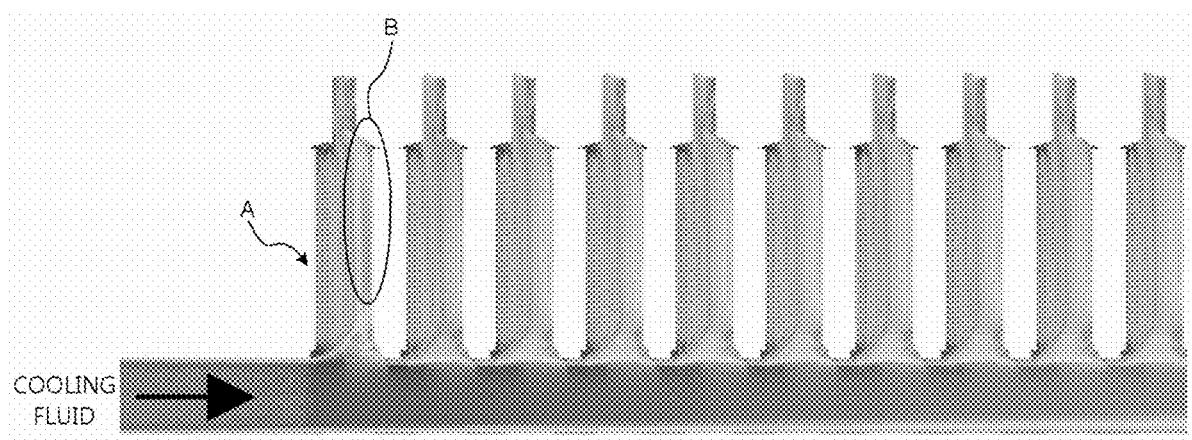
FIG. 8 is a view illustrating heat transfer conditions in any duct of a rotor.
Figure 9:
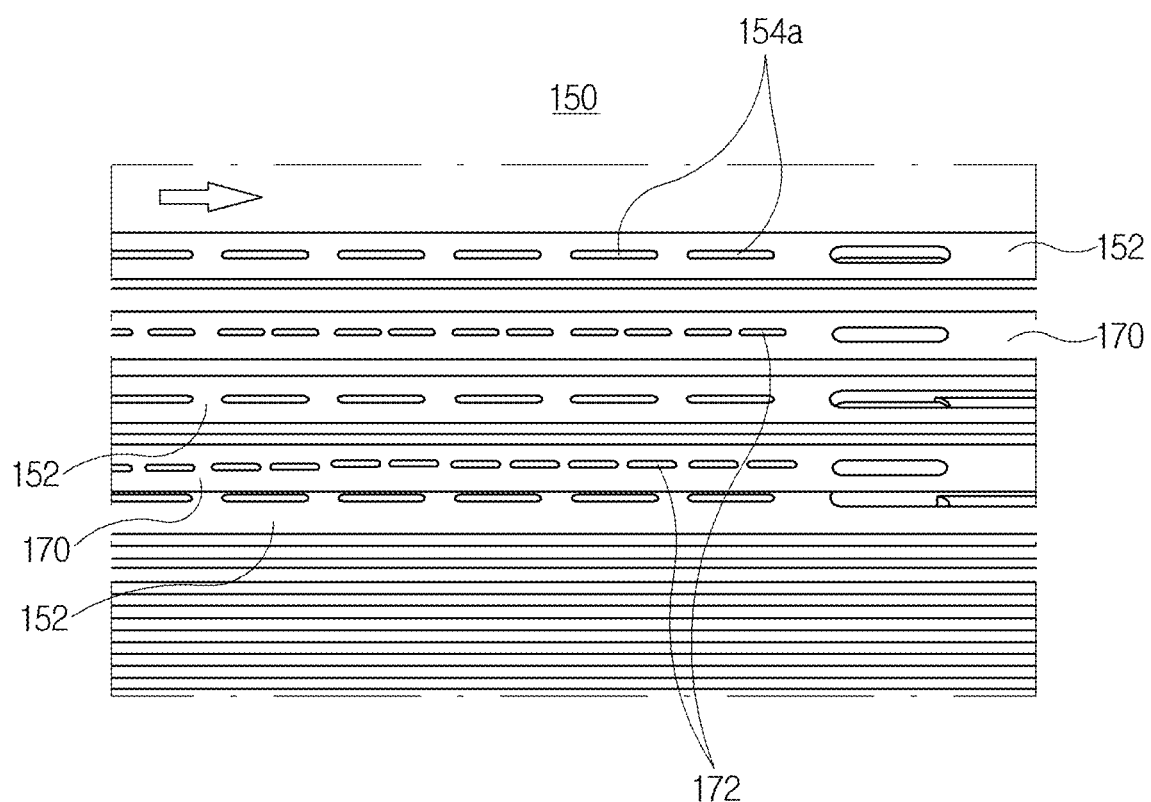
FIG. 9 is a partial perspective view showing a stacked structure of the coil turn in accordance with FIG. 2.

FIG. 8 is a view illustrating heat transfer conditions in any duct of a rotor. FIG. 9 is a partial perspective view showing a stacked structure of the coil turn in accordance with FIG. 8.

As stated above, a plurality of ducts 154a each having a slit shape are longitudinally formed through the planar surfaces of the conductors 152 that form the linear part 154.

The turn insulators 170 are respectively interposed between the conductors 152 having a multilayer structure. A plurality of through holes 172 each having a slit shape are formed in each turn insulator 170 at positions of the ducts 154a of the corresponding conductors 152. The turn insulator 170 is made of non-conductive material. Cooling fluid cools the coil turn 150 while flowing through the through holes 172 and the ducts 154a, and then is discharged out of the rotor 100.

Referring to temperature distribution of cooling fluid that flows along the linear part 154 of any coil turn 150, the flow of cooling fluid is distributed from the first duct to the last duct of the center of the rotor according to the arrangement of the ducts 154a formed in the conductors 152 (refer to FIG. 8). With regard to cooling fluid that flows in one linear part 154, the temperature in region B is higher than that in region A that is an inlet side. As such, if an imbalance in heat transfer by the cooling fluid is caused, there is a problem in that the efficiency of cooling the coil turns 150 and the rotor body 110 is reduced.

Therefore, to overcome such a problem, the present disclosure provides a method of improving the arrangement of the through holes 172 of the turn insulator 170, thus solving the problem of an imbalance in heat transfer, and enhancing the cooling efficiency.

As shown in FIG. 9, the through holes 172 formed in the turn insulator 170 may have a shape in which two through holes 172 are arranged at a position corresponding to each of the ducts 154a. That is, two through holes 172, the length of each of which is ½ of the length of one duct 154a, may be arranged to correspond to each duct 154a. Here, the direction of the flow of cooling fluid is the direction of the arrow. As such, since a plurality of through holes 172 are formed to correspond to each duct 154a, there is an advantage in that heat transfer by the cooling fluid can be prevented from being biased to one side.

The through holes of the turn insulator may be modified in various forms, as follows.

Figure 10:
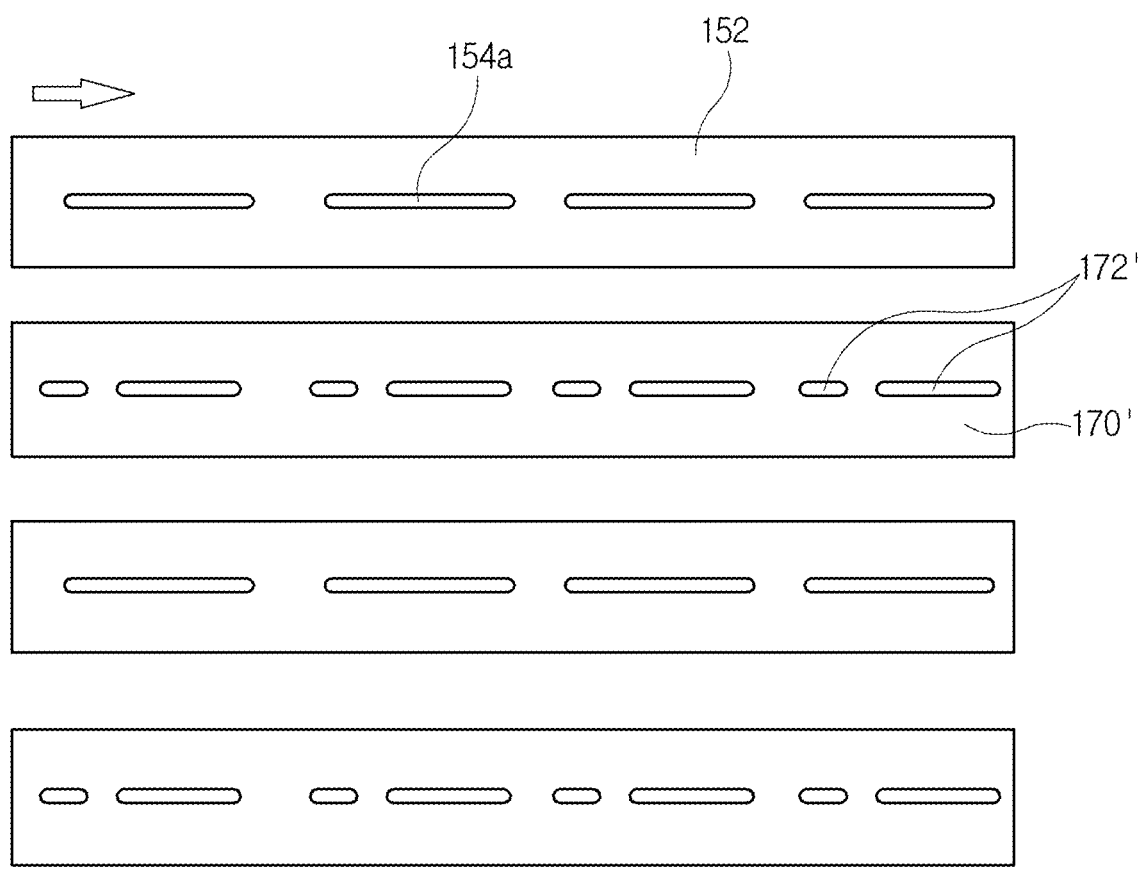
FIG. 10 is a plan view illustrating another exemplary embodiment of a turn insulator in accordance with the coil turn of FIG. 2.

FIG. 10 is a plan view illustrating yet another exemplary embodiment of the turn insulator in accordance with the coil turn of FIG. 8. As shown in FIG. 10, through holes 172' of a turn insulator 170' may have a shape in which two through holes 172' having different lengths are arranged at a position corresponding to each duct 154a. In detail, two through holes 172' which have a length ratio of 1:2 may be provided for each duct 154a such that the through hole corresponding to an inlet side at which cooling fluid is drawn into the sub-slot is larger than the other. Here, the direction of the flow of cooling fluid is the direction of the arrow.

Figure 11:
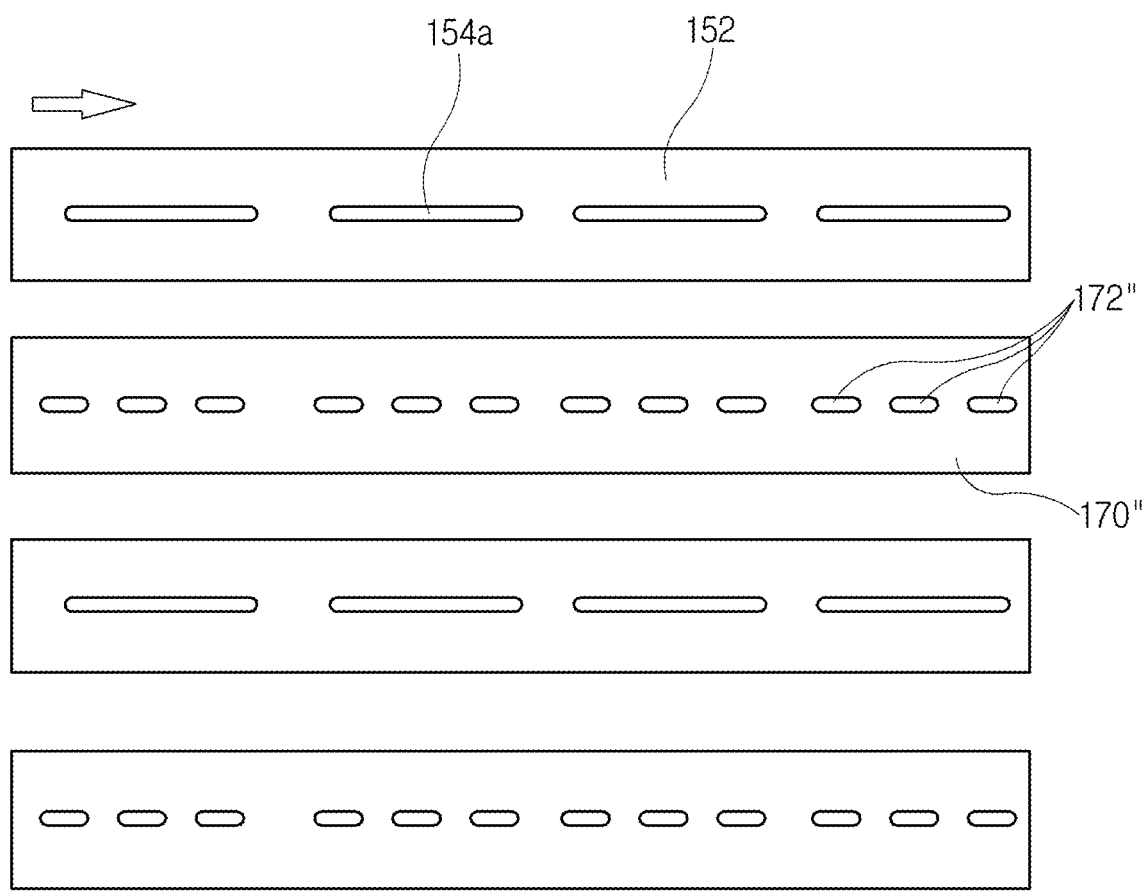
FIG. 11 is a plan view illustrating yet another exemplary embodiment of the turn insulator in accordance with the coil turn of FIG. 2.

FIG. 11 is a plan view illustrating another embodiment of a turn insulator in accordance with the coil turn of FIG. 8. As shown in FIG. 11, through holes 172" of a turn insulator 170" may have a shape in which three through holes 172" are arranged at a position corresponding to each duct 154a. That is, three through holes 172", the length of each of which is ⅓ of the length of one duct 154a, may be arranged to correspond to each duct 154a. Here, the direction of the flow of cooling fluid is the direction of the arrow.

As such, the modification in the shape of the through holes of the turn insulator is a kind of method for designing the flow rate of cooling fluid passing through the thorough holes by controlling the areas of the through holes. Even without largely changing the structure of the coil turn or the cooling path, the problem of imbalance in heat transfer by the cooling fluid can be solved, and the efficiency of cooling the coil turn and the rotor body can be enhanced.

As described above, in a rotor assembly having an improved cooling path in accordance with an exemplary embodiment of the present disclosure, as the structure of the cooling path formed in a coil turn is modified into a wave form, the contact area between cooling fluid and the inner surface of the coil turn can be increased, whereby the cooling efficiency can be enhanced. Furthermore, in the present disclosure, a problem of imbalance in heat transfer in a duct can be solved by modifying the shape of a through hole of a turn insulator, whereby the efficiency of cooling the coil turn can be enhanced.

An exemplary embodiment of the present disclosure described above and shown in the drawings should not be interpreted as limiting the technical spirit of the present invention. The scope of the present invention is restricted by only the writing of the claims, and a person having ordinary skill in the art to which the present invention pertains may modify and change the technical spirit of the present invention in various forms. Accordingly, the modification and change may fall within the scope of the present invention as long as they are evident to those skilled in the art.

What is claimed is:

1. A rotor assembly, comprising:
    a plurality of coil turns each comprising a plurality of conductors stacked in a multilayer structure, each of the coil turns including:
        a linear part interposed between teeth of a rotor body, with a plurality of ducts formed through top and bottom sides of the linear part and aligned with each other in a direction of the stacking of the multilayer structure so that cooling fluid flows through the ducts; and
        a curved part extending from the linear part and disposed in an arc shape enclosing an outer circumferential surface of a spindle, the curved part including a planar surface in which is formed a wave-shaped cooling path communicating with the ducts;
    a turn insulator interposed between the conductors and configured to insulate the conductors from each other, the turn insulator having planar surfaces respectively facing opposing surfaces of adjacent conductors of the plurality of conductors; and
    a plurality of arc-shaped slots formed in the opposing surfaces of the curved part of the adjacent conductors and respectively disposed between a plurality of connection parts connecting the plurality of arc-shaped slots, the plurality of arc-shaped slots forming a cooling path passing through the turn insulator and extending alternatingly on opposite sides of the turn insulator between the connection parts.

2. The rotor assembly according to claim 1, wherein the connection parts are formed between the arc-shaped slots on each of the opposing surfaces of the curved part and have a streamlined edge to minimize flow resistance occurring when the cooling fluid flowing through the cooling path flows over the connection parts.

3. The rotor assembly according to claim 1, wherein a height (A) of the connection parts is greater than a radius (D2) of each of the slots.

4. The rotor assembly according to claim 1, wherein the cooling path is configured according to one of
    the slots having a same radius and being repeatedly formed between the connection parts, and
    the slots having different radii and being alternately arranged between the connection parts.

5. The rotor assembly according to claim 1, wherein the turn insulator comes into contact with each of the connection parts to insulate the connection parts of one conductor of the plurality of conductors from another conductor.

6. The rotor assembly according to claim 5, wherein the turn insulator includes a planar surface through which a plurality of through holes are formed so as to communicate with the slots, respectively, and a closed portion corresponding to the connection parts.

7. A rotor assembly having an improved cooling path, comprising:
    a coil turn comprising a pair of conductors forming a top layer and a bottom layer that directly face each other, the conductors being stacked in a multilayer structure, the coil turn including:
        a linear part interposed between teeth of a rotor body, with a plurality of ducts formed through top and bottom sides of the linear part and aligned with each other in a direction of the stacking of the multilayer structure so that cooling fluid flows through the ducts; and
        a curved part extending from the linear part and disposed in an arc shape enclosing an outer circumferential surface of a spindle, the curved part including a planar surface in which is formed a wave-shaped cooling path communicating with the ducts and comprising opposing cooling paths respectively formed in the top layer and the bottom layer as a plurality of slots respectively disposed between a plurality of connection parts connecting the plurality of slots.

8. The rotor assembly according to claim 7, wherein the connection parts are formed on each of opposing surfaces of the curved part and have a streamlined edge to minimize flow resistance occurring when the cooling fluid flowing through the cooling path flows over the connection parts.

9. The rotor assembly according to claim 7, wherein a height (A) of the connection parts is greater than a radius (D2) of each of the slots.

10. The rotor assembly according to claim 7, wherein the cooling path is configured according to one of
    the slots having a same radius and being repeatedly formed between the connection parts, and
    the slots having different radii and being alternately arranged between the connection parts.

11. A rotor assembly, comprising:
    a rotor body;
    teeth extending from an outer circumferential surface of the rotor body outward in a radial direction, the teeth separated by a space including an upper portion and a lower portion; and a coil turn that is disposed in the upper portion of the space and is interposed and supported between the teeth, the lower portion of the space below the coil turn including a sub-slot through which the cooling fluid is drawn, wherein the coil turn includes:
- a plurality of conductors stacked in a multilayer structure, with a plurality of ducts formed through top and bottom sides of the conductors and aligned with each other in a direction of the stacking of the multilayer structure so that cooling fluid flows through the ducts, each duct of the plurality of ducts having first and second ends formed at opposite extremes of the duct in a longitudinal direction of the conductors; and
- a turn insulator interposed between the conductors and configured to insulate the conductors from each other, the turn insulator having a structure defined by a plurality of through holes formed in the turn insulator, wherein the plurality of through holes are configured to allow a flow rate of the cooling fluid at an inlet side of the structure to be greater than a flow rate of the cooling fluid at an outlet side of the structure, wherein each through hole of the plurality of through holes is formed as a plurality of slits, each slit having two flat sides and two rounded ends in correspondence to a shape of the ducts, the plurality of slits including an inlet slit and an outlet slit arranged in the longitudinal direction, and wherein the inlet slit has one rounded end disposed toward the inlet side at a position corresponding to the first end of one of the plurality of ducts, and the outlet slit has one flat side disposed toward the outlet side at a position corresponding to the second end of the one of the plurality of ducts.

12. The rotor assembly according to claim 11, wherein the through holes are formed such that two slits each having a size of ½ of the duct are disposed at a position corresponding to each of the ducts.

13. The rotor assembly according to claim 12, wherein the through holes are formed such that one of the through holes that is adjacent to a side at which cooling fluid is drawn into the sub-slot is larger than the other.

14. The rotor assembly according to claim 11, wherein the through holes are formed such that three slits each having a size of ⅓ of the duct are disposed at a position corresponding to each of the ducts.

15. The rotor assembly according to claim 11, wherein the through holes are formed such that two slits each having a length ratio of 1:2 are disposed at a position corresponding to each of the ducts.

16. The rotor assembly according to claim 15, wherein the through holes are formed such that a larger one of the two slits is disposed adjacent to an inlet side at which the cooling fluid is drawn.

* * * * *